Dec. 2, 1958     G. A. GAYLER     2,863,095
ELECTRIC WIRING INSTALLATIONS FOR ELECTRIC
EQUIPMENT ON VEHICLES
Filed May 16, 1955     3 Sheets-Sheet 1

INVENTOR
GEORGE ALFRED GAYLER

BY

ATTORNEY

Dec. 2, 1958
G. A. GAYLER
2,863,095
ELECTRIC WIRING INSTALLATIONS FOR ELECTRIC EQUIPMENT ON VEHICLES
Filed May 16, 1955
3 Sheets-Sheet 2
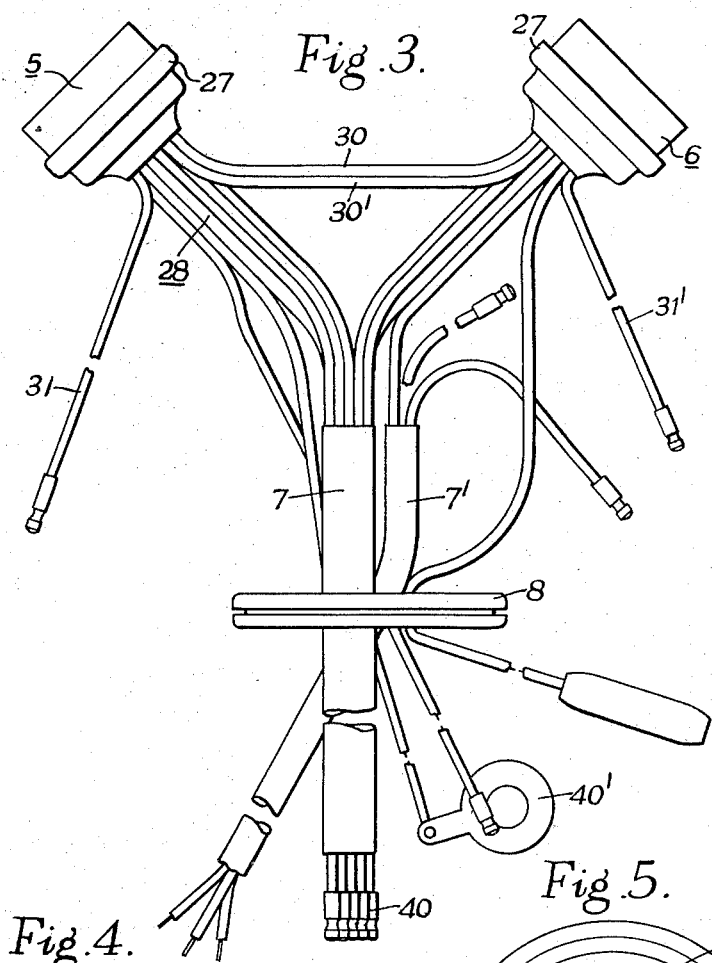
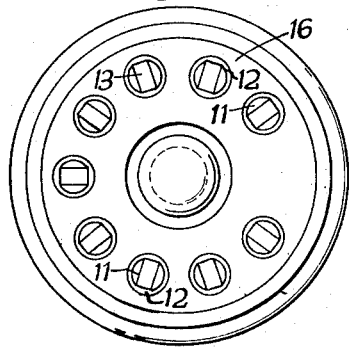
INVENTOR
GEORGE ALFRED GAYLER
BY
ATTORNEY

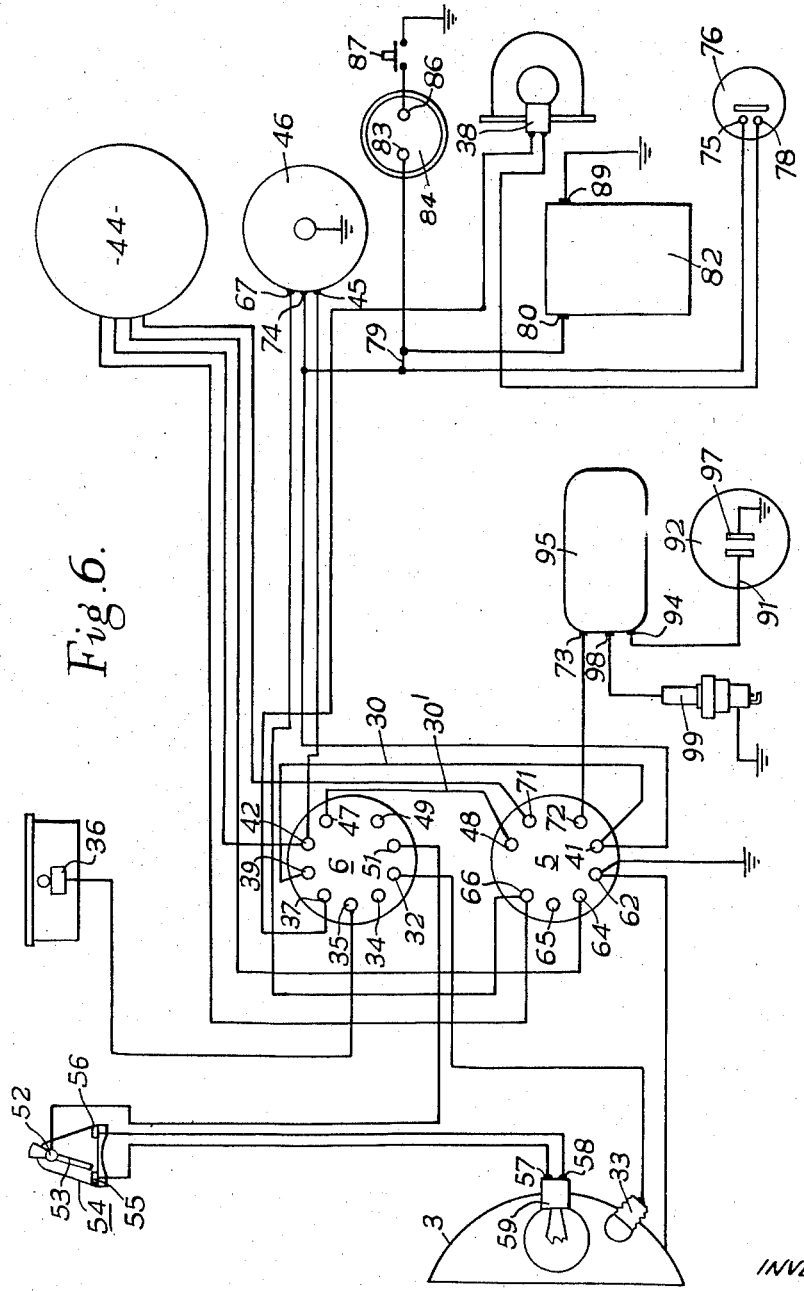

United States Patent Office 2,863,095
Patented Dec. 2, 1958

2,863,095

ELECTRIC WIRING INSTALLATIONS FOR ELECTRIC EQUIPMENT ON VEHICLES

George Alfred Gayler, Bletchley, England, assignor to Wipac Development Limited, Bletchley, England Application May 16, 1955, Serial No. 508,679

Claims priority, application Great Britain May 18, 1954

4 Claims. (Cl. 315—82)

The present invention relates to electric wiring installations for electric lighting and/or ignition equipment on vehicles.

In existing motorcycle headlamps, the space available over the headlamp reflector for housing electric lighting and/or ignition switches is comparatively small and consequently the operation of disconnecting the leads of the lighting and/or ignition circuits from the switch terminals and subsequently reconnecting them, in the event of one of the switches needing to be repaired or replaced, necessitates the use of skilled labor.

It is an object of the present invention to avoid this disadvantage.

A further object of the invention is to enable a fault in any of the individual circuits of the whole circuit installation to be traced easily and quickly without disturbing the wiring or disconnecting any leads.

Figure 1:
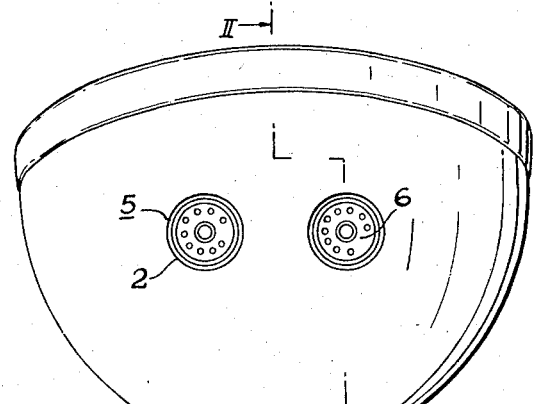
Figure 2:
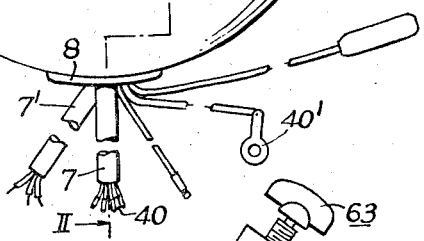
Figure 2:
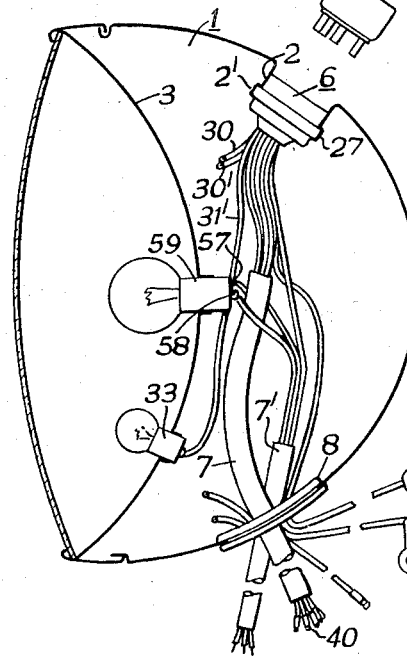

A preferred embodiment of the invention as applied to the lighting and ignition installation of a motorcycle will now be described by way of example with reference to the accompanying drawings in which:

Figure 1 is a top rear view of a motorcycle headlamp,

Figure 2 is a section of the headlamp on the line II—II in Fig. 1 and also shows a removable switch in elevation ready for fitting into the headlamp, Figure 3 is a view of a detachable electric wiring unit in elevation and removed from the headlamp, Figure 4 is a vertical section of a pin socket plug, Figure 5 is a plan view of a pin socket plug as seen from the top of Figure 4, and Figure 6 is a circuit diagram showing the connections of two pin socket plugs in the circuit of a motorcycle lighting and ignition installation.

A motorcycle headlamp casing 1 (Figs. 1 and 2) is formed with two recessed housings 2, disposed side-by-side and each having a tubular wall which is inwardly flanged at 2'. The recessed housings 2 are located in the upper part of the headlamp casing 1 behind the headlamp reflector 3 and have detachably secured in their inner flanged ends two plugs generally indicated in Fig. 1 by reference numerals 5 and 6 connected to a wiring harness embodying switch leads of the installation. These leads of the harness which have to pass out through the bottom of the headlamp casing 1 are threaded through a rubber grummet 8 which is fitted in known manner in an opening in the bottom part of the headlamp casing 1. Each of the two plugs 5 and 6 is a push fit in the circular opening in the inner end of the corresponding recessed housing 2.

Each of the two plugs 5 and 6 comprises a cylindrical block 10 (Figures 4 and 5) of electrically insulating synthetic resin material bored with a number of holes 11 having their axes parallel to the longitudinal central axis of the block. The longitudinal axes of the holes lie on the surface of a cylinder coaxial with the cylindrical block 10. Into each hole 11 is fitted a metal tube 12 which forms a terminal pin socket. Each tube is open at one end and terminates at the other end in a U-shaped metal strip 13 which projects from the cylindrical block 10. The ends of the metal tubes 12 substantially coincide with the plane surfaces 14 and 15 at the ends of the cylindrical block 10.

A circular disc 16 made of electrically insulating material and having a larger diameter than the diameter of the cylindrical block 10 has holes formed in it in positions corresponding to the holes in the cylindrical block but the holes in the disc 16 are of such a cross-section that, when the disc is fitted over the end surface of the cylindrical block with the U-shaped strips projecting through the holes in the disc 16, the metal tubes 12 cannot rotate about their longitudinal axes. The insulating disc 16 is tightly connected to the cylindrical block 10 by a rivet 19 fitted through a hole bored along the central longitudinal axis of the cylindrical block and disc 16. The diameter of this central bore is enlarged at 21 at the end remote from the disc 16 in order to house the head 22 of the rivet 19. This rivet is upset at its other end to form another head 24 which holds the disc 16 to the cylindrical block 10.

An outer sleeve 26 of strong flexible rubber encloses the cylindrical block 10 and the rim of the disc 16. One end of the sleeve 26 coincides with the plane surface 14 of the cylindrical block 10 remote from the disc 16, and the other projects beyond the disc 16, first maintaining a cylindrical shape of slightly smaller internal diameter than the diameter of the cylindrical block 10 for a length slightly longer than the length of the U-shaped metal strips 13 and then curving inward for a short distance to a diameter approximately half that of its other end.

All the switch leads to the plug containing the pin sockets pass through the smaller diameter end 29 of the sleeve 26 and are connected in known manner to the respective U-shaped strips 13 on the metal tubes 12.

A flange 27 is formed by the part of the external surface of the sleeve 26 which surrounds the rim of the disc 16. It is by this flange 27 that the socket plug is located within the inner flanged end 2' at the inner end of the corresponding recess 2 in the upper part of the headlamp.

As shown in Fig. 5, the lighting switch plug 6 comprises nine terminal pin sockets. Each of these pin sockets is connected to a flexible lead forming part of a harness illustrated in Fig. 3. Two of the leads 30 and 30' (Fig. 3) interconnect two of the pin sockets in the ignition plug 5 to two of the pin sockets in the lighting plug 6. The remaining leads are provided at their other ends with terminal connections such as pins 40 and a washer 40', and some of them are grouped together and threaded through flexible sleeves 7, 7'. Except for an earth lead 31 from the ignition plug 5 and pilot lamp lead 31' from the lighting plug 6, all the remaining leads pass through an aperture in the circular circumferentially grooved grummet 8. The lighting plug 6, ignition plug 5 and harness thus form a detachable unit which can easily be removed from the headlamp.

In use, the lighting and ignition circuits of the motorcycle are arranged as described below. Referring, in the circuit diagram of Fig. 6, to the terminal pin sockets of the lighting plug 6 in turn, terminal pin socket 32 is connected to a terminal of a pilot lamp holder 33, terminal pin socket 34 is free, terminal pin socket 35 is connected to a terminal on a speedometer lamp holder 36, terminal pin socket 37 is connected to one terminal on a stop and rear lamp holder 38, terminal pin socket 39 is connected by lead 30 already referred to, to a terminal pin socket 41 in the ignition switch plug 5, terminal pin socket 42 has two leads one connected to an alternator 44 and the other to a terminal 45 of a rectifier 46, terminal pin socket 47 is connected by lead 30' to a terminal pin socket 48 in the ignition switch plug 5, terminal pin socket 49 is free and terminal pin socket 51 is connected to a pivot 52 for a contact arm 53 of a dip switch 54. The two contacts 55 and 56 of the dip switch 54 with which the said contact arm 53 cooperates, are connected to two terminals 57 and 58 on a headlamp bulb holder 59.

The ignition switch plug 5 comprises eight terminal pin sockets. Referring to each terminal pin socket in turn, terminal pin socket 62 has two leads one connected to earth and the other to the back of the headlamp reflector 3; terminal pin socket 64 is connected to the alternator 44, terminal pin socket 65 is free, terminal pin socket 66 has two leads, one connected to the alternator 44 and the other to the terminal pin socket 67, on the rectifier 46, terminal pin socket 48 is connected to terminal pin socket 47 of the lighting switch plug 5, terminal pin socket 71 is connected to the alternator 44, and terminal pin socket 72 is connected to a terminal 73 common to the primary and secondary of an ignition coil 95, terminal pin socket 41 has two leads, one connected to terminal 74 of the rectifier 41 and the other to terminal pin socket 39 in the lighting switch plug 6.

The stop and rear lamp holder 38 has two terminals, one connected to the terminal pin socket 37 of the lighting switch plug 6, as mentioned above, and the other connected to terminal 75 of a stop switch 76. Terminal 75 of the stop switch 76 is connected to a terminal 74 of the rectifier 46, and is also connected to a lead 79 from the negative terminal 80 of a battery 82.

A terminal 83 on a horn 84 is connected to a lead from the negative terminal 80 of the battery and terminal 86 of the horn is connected via a horn push-button 87 to earth. The positive terminal 89 of the battery 82 is earthed.

A terminal 91 of the distributor 92 is connected in the usual way to the primary terminal 94 of a coil 95 and terminal 97 is earthed, and likewise the secondary terminal 98 on the coil 95 is connected to the center electrode of the sparking plug 99.

In use, a three-pole plug-in lighting switch 63 (Figure 2) of known kind is removably inserted in the recessed housing 2 fitted with the lighting plug 6 and a similarly constructed ignition switch (not shown) is removably inserted in the recessed housing 2 fitted with the ignition plug 5.

Either of these two switches can be removed, when required for repair or replacement, or to enable the circuits of the installations to be tested.

I claim:

1. A vehicle headlamp, comprising a headlamp casing formed with an open bottomed cylindrical recess; a plug made of electrically insulating material and detachably engaged in the bottom of said recess; terminal pin sockets carried in said plug; switch leads connected to said terminal pin sockets; contact members connected to the ends of said switch leads remote from said plug; and a removable electric switch having terminal pins detachably engaged in the terminal pin sockets carried in said plug.

2. An electric wiring unit for a vehicle wiring installation, comprising a plurality of terminal pin sockets; ignition circuit and lighting circuit switch leads connected to at least some of said terminal pin sockets; a detachable first plug carrying terminal pin sockets connected to the ignition circuit switch leads; a detachable second plug carrying terminal pin sockets connected to the lighting circuit switch leads; a sleeve surrounding switch leads connected to terminal pin sockets in both plugs; a grummet through which said sleeve and said switch leads surrounded by said sleeve pass; terminal contact members connected to the free ends of the ignition circuit and lighting circuit switch leads; and at least one further switch lead connecting one of the pin sockets carried in said first plug to one of the pin sockets carried in said second plug.

3. A vehicle headlamp, comprising an outer casing and a reflector mounted within said outer casing, said reflector partitioning off a hollow space behind it and within the casing, the top part of said casing being formed with two open-bottomed recesses projecting into said hollow space and the bottom part of said casing being formed with an opening into said hollow space; and also comprising an electric wiring unit including a plurality of terminal pin sockets; ignition circuit and lighting circuit switch leads connected to at least some of said terminal pin sockets; a first plug carrying terminal pin sockets connected to the ignition circuit switch leads; a second plug carrying terminal pin sockets connected to the lighting circuit switch leads, said first and second plugs being engaged as push fits in said open-bottomed recesses respectively; a sleeve surrounding switch leads connected to terminal pin sockets in both plugs; a grummet engaging in said opening in the bottom part of said casing, through which grummet said sleeve and said leads surrounded by said leads pass from the inside to the outside of said outer casing; terminal contact members connected to the free ends of said ignition circuit and lighting circuit switch leads; and at least one further switch lead connecting one of the pin sockets carried in said first plug to one of the pin sockets carried in said second plug.

4. A vehicle headlamp comprising a headlamp casing formed with a recess; a plug provided with means for detachably retaining said plug in said recess; terminal contact members carried in said plug and grouped so as to cooperate with corresponding contact members on a removable electric switch; switch leads connected at one end to said terminal contact members and provided at their other ends with further contact members, said plug and switch leads forming a detachable unit of which part including said plug, is housed in said headlamp.

References Cited in the file of this patent

UNITED STATES PATENTS

| 1,350,426 | Seng | Aug. 24, 1920 |
| 1,714,483 | Schneider et al. | May 21, 1929 |
| 1,946,965 | Douglas | Feb. 13, 1934 |
| 2,465,085 | Griffiths et al. | Mar. 22, 1949 |

FOREIGN PATENTS

| 359,786 | Great Britain | Oct. 29, 1931 |
| 783,993 | France | July 20, 1935 |